(12) United States Patent
Boeck

(10) Patent No.: US 7,258,525 B2
(45) Date of Patent: Aug. 21, 2007

(54) GUIDE BLADE FIXTURE IN A FLOW CHANNEL OF AN AIRCRAFT GAS TURBINE

(75) Inventor: Alexander Boeck, Kottgeisering (DE)

(73) Assignee: MTU Aero Engines GmbH, Munich (DE)

( * ) Notice: Subject to any disclaimer, the term of this patent is extended or adjusted under 35 U.S.C. 154(b) by 112 days.

(21) Appl. No.: 10/507,176

(22) PCT Filed: Mar. 5, 2003

(86) PCT No.: PCT/DE03/00686

§ 371 (c)(1),
(2), (4) Date: Aug. 4, 2005

(87) PCT Pub. No.: WO03/076768

PCT Pub. Date: Sep. 18, 2003

(65) Prior Publication Data

US 2006/0008347 A1 Jan. 12, 2006

(30) Foreign Application Priority Data

Mar. 12, 2002 (DE) .............................. 102 10 866

(51) Int. Cl.
*F01D 9/00* (2006.01)
(52) U.S. Cl. ................. 415/209.3; 415/191; 415/211.2
(58) Field of Classification Search ................ 415/191, 415/209.3, 211.2
See application file for complete search history.

(56) References Cited

U.S. PATENT DOCUMENTS

| 2,445,661 | A | * | 7/1948 | Hayne et al. .................. 60/799 |
| 3,443,791 | A | * | 5/1969 | Sevetz et al. ................. 415/115 |
| 4,384,822 | A |   | 5/1983 | Schweikl et al. |
| 4,511,306 | A | * | 4/1985 | Hultgren ..................... 415/136 |
| 5,022,818 | A | * | 6/1991 | Scalzo ....................... 415/209.3 |

FOREIGN PATENT DOCUMENTS

| DE | 37 00 668 A1 | 7/1987 |
| DE | 24 35 071 C1 | 12/2000 |
| EP | 1 039 096 A2 | 9/2000 |
| GB | 2 260 789 A | 4/1993 |

* cited by examiner

*Primary Examiner*—Ninh H. Nguyen
(74) *Attorney, Agent, or Firm*—Crowell & Moring LLP

(57) ABSTRACT

An arrangement for detachably fixing a guide blade segment that forms part of a transition channel of an aircraft gas turbine comprises high-pressure and low-pressure turbines. The arrangement has a groove-hook-type connection in the front area of the outer platform of the guide blade segment for its radial fixation and at least one pin that penetrates the hook-groove-type connection for securing it against rotation of the guide blade segment.

4 Claims, 2 Drawing Sheets

GUIDE BLADE FIXTURE IN A FLOW CHANNEL OF AN AIRCRAFT GAS TURBINE

BACKGROUND AND SUMMARY OF THE INVENTION

This invention relates to an arrangement for fixing a guide blade segment that forms part of a transition channel.

Modern aircraft gas turbines frequently comprise a so-called core engine with a high-pressure turbine having a relatively small diameter, which is arranged downstream from a low-pressure turbine having a relatively large diameter. This creates the necessity of transitioning the ring channel, which extends through the gas turbine and is equipped with guide blades, behind the high-pressure turbine from its small diameter to the large diameter of the low-pressure turbine, which occurs with the aid of a so-called transition channel.

Such engines furthermore have high bypass ratios and low speeds of the low-pressure turbine shaft, which is generally separated in relation to the high-pressure turbine shaft; moreover the urgency exists to design the core engines in an increasingly compact and powerful manner, which leads to increasingly longer axially extending transition channels with greater differences between the radii of the channel cross-sections that need to be taken into consideration.

Such an arrangement, which is called a "transition duct sealing device", is known from German publication DE 37 00 668 A1. The inner wall (16) of the transition duct consists of several segments (18), which are screwed together with the inner shrouds (20) of the guide blade clusters (22). Additional, cone-shaped parts (34, 42) with seal elements (40, 70) are screwed to the segments (18). The screw connection between the rear cone (42) and the segments (18) permits limited relative axial and radial movements, with the cone (42) comprising slots (46), in which bolts (32) are guided with some play. Hence the guide blade clusters (22) bear the segments (18) and the cones (34, 42), and no information is provided on the fastening of the guide blade clusters (22) on the outer turbine housing.

German publication DE 24 35 071 C1 protects a stator blade for a gas turbine jet engine, i.e. a guide vane. The guide vane (20) is located on the downstream end of the combustion device (12) upstream from a turbine rotor stage (16) of the high-pressure turbine. Due to the high gas temperatures directly behind the combustion chamber, the guide vane (20) has an air-cooled design. The pressure of the cooling air is also used to stabilize and align the multi-part blade design during operation. Hence, no integral, inherently stable guide blade segments exist.

British document GB 2 260 789 A relates to an arrangement for fixing guide blade segments. The guide blade segments (10) are fastened to the turbine housing and guided only via their outer platform, i.e. their outer band (12). For this purpose each band (12) contains on the upstream end a flange (30) that is hook-shaped in its longitudinal section. The flange is supported on one side radially on a housing part (32). On the downstream end each band (12) is equipped with a support member (26), a hook (22) and a land (24). Each support member (26) engages in the circumferential direction into the recess (24) of the adjoining guide blade segment (10). Between the support member (26), recess (24), and hook (22), a small free space remains, in which a stud (28) that is attached to the housing engages in an axial fashion. The area assumes a radial fixation as well as a rotational prevention function in the circumferential direction. Furthermore, the bands here rest axially on a housing component (18). In the area of the guide elements (22, 24, 26, 28), the design is relatively complex as well problematic from a stability point of view.

This is where the invention comes in, the object of which is to create an inexpensive, easy-to-mount and well-sealing arrangement that is at the same time, weight-saving, for the attachment of a guide blade segment that forms part of a transition channel.

This object is achieved pursuant to the invention.

The design pursuant to the invention has a series of advantages. For example, a simple and safely functioning seal of the guide blade segments on the inside and outside, and thus to the disk area between the high-pressure and low-pressure turbine, is possible through the straight surface contact between the bars and bearing surfaces of the housing and the bearing pedestal. Through the groove-hook-type connection in the front area of the outer platform of the guide blade segment, these are held radially in the turbine housing in a safe and permanent fashion and are fixed in the circumferential direction by means of the pins engaging in the groove-hook-type connection. The bearing area located on the turbine housing for accommodating the guide blade segment can at the same time serve as a bearing area for a channel segment of the transition channel engaging likewise on the bearing surface so that the mounted guide blade segment of the transition channel is a locking element for the channel segment arranged upstream.

The arrangement pursuant to the invention of the grooves on the groove-hook-type connection on the housing and the arrangement of the hooks on the outside platform part of the channel segment enables a simple and accurate production of these parts, leading to significant weight and cost advantages.

The invention is described in the following based on an exemplary embodiment illustrated in the drawings in a more or less diagrammatic fashion.

DETAILED DESCRIPTION OF THE INVENTION

Figure 1:
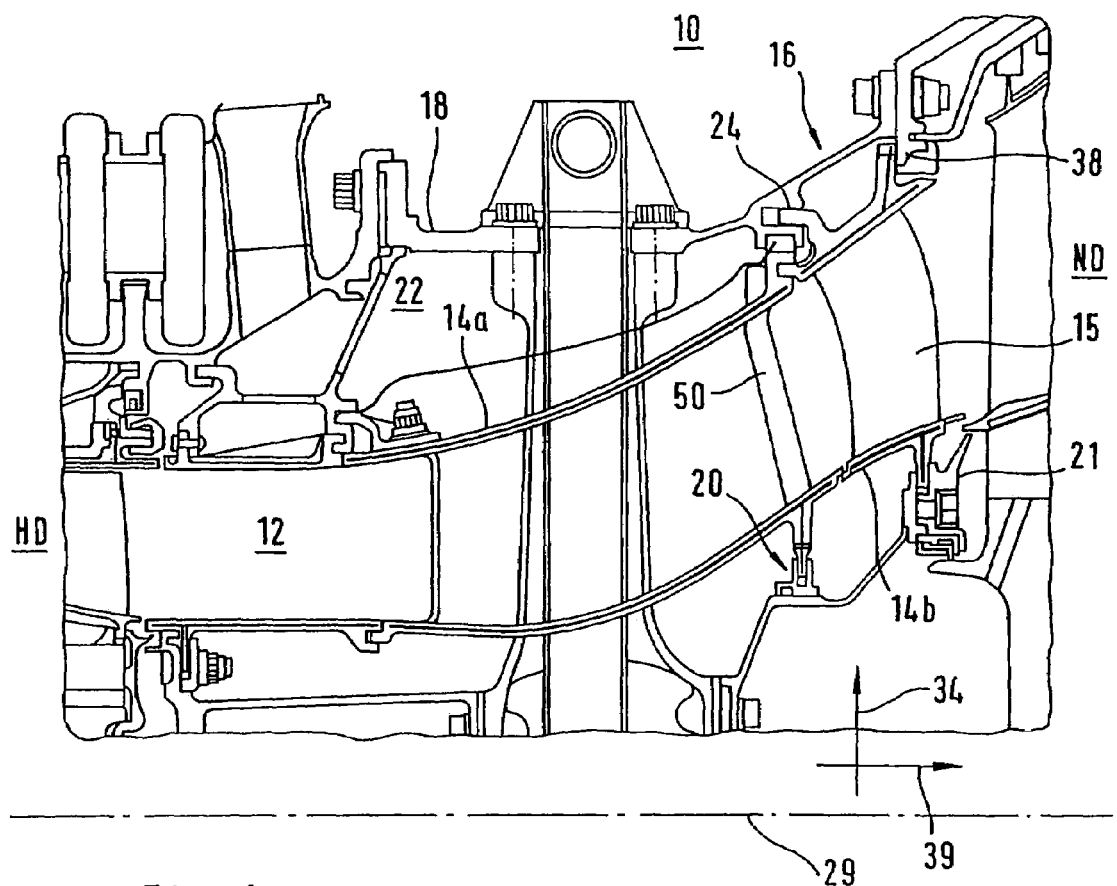
FIG. 1 is a partial section through a two-stage aircraft gas turbine, which is shown only in part, in the area of the transition channel comprising the guide blades between the high-pressure and low-pressure parts.

An aircraft gas turbine 10, which is shown only diagrammatically in FIG. 1 in the transition area between the high-pressure turbine HD and low-pressure turbine ND, contains a flow channel 12 designed as a ring channel, which leads from the small diameter of the high-pressure part HD to the larger diameter of the low-pressure part ND. This transition occurs via a transition channel 14, which comprises downstream a channel segment 14a and upstream a channel segment 14b of special design holding a plurality of guide blades 15, said segment being referred to in the following as a guide blade segment 16.

A housing, which overall has been designated with the number 18 and has a familiar structure, encloses the high and low-pressure parts of the turbine. Here the bearing pedestal 21 close to the seal 20 located in the channel intermediate space 22 as well as the bearing surfaces 24, 35 and 38 are of interest.

Figure 2:
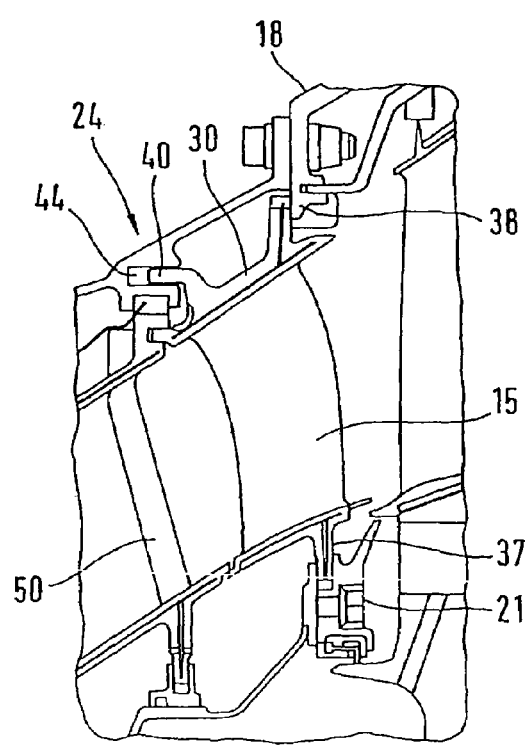
FIG. 2 is a section from FIG. 1 relating to the area of the guide blades.
Figure 3:
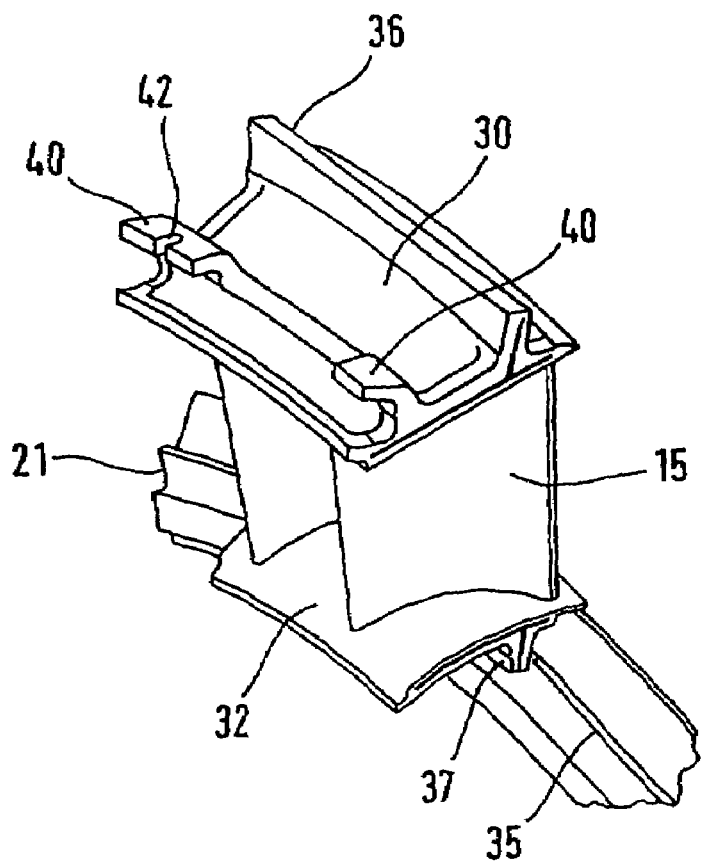
FIG. 3 is a perspective view of the area of the guide blades pursuant to FIG. 2.

The guide blade segment 16 that bears the guide blades 15 comprises an outwardly—to the inside wall of the housing 18—directed outer platform 30 and an inner platform 32 that faces the axis of rotation 29 of the aircraft gas turbine—see especially FIG. 3—, which bear bars 36 and 37 extending in the radial direction 34, respectively. These bars are assigned bearing surfaces 38 or 35 on the housing 18 or on the bearing pedestal 21—see FIG. 2—, on which the bars find axial support in the assembled state of the aircraft gas turbine.

Figure 4:
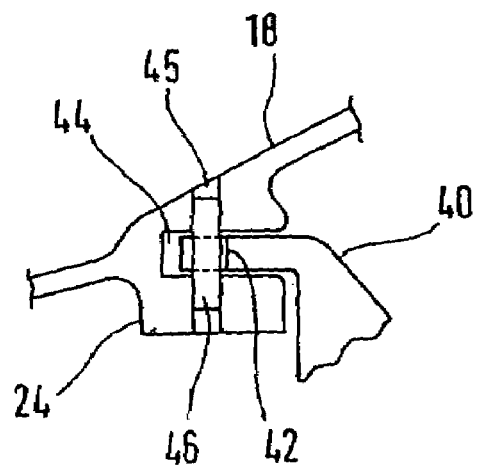
FIG. 4 is a detail in enlarged view.

The platform 30 moreover comprises downstream hook-shaped projections 40 that are bent against the axial direction 39, of which one projection is equipped with a slot 42, see FIG. 3. These projections 40 are assigned corresponding grooves 44, which are located in the bearing surfaces 24 of the housing 18; see also FIG. 4. One of these grooves is equipped with an opening 45 that is assigned to the slot 42 for the purpose of accommodating a pin 46, as can also be clearly seen in FIG. 4.

By interacting with the hook-shaped projections 40, the grooves 44 form a so-called hook-groove-type connection, which enables a positive attachment of the guide blade segment 16 in the turbine housing, wherein by means of the pin 46 this segment is also secured against rotation around the axis of rotation 29.

The design of the bars 36 and 37 of the outer and inner platforms 30 and 32 as well as the assigned bearing surfaces on the bearing areas 24 affixed to the housing and the bearing pedestal 21 is such that a straight surface contact exists between these surfaces, which enables an operationally safe seal on the contact areas and hence the disk area of the low-pressure turbine.

After installation of the guide blade segment, it forms a lock for the channel segment 14a arranged upstream, which is received on the bearing surfaces 24 of the housing 18 via a strut molding 50.

The above-described arrangement with the hook-groove-type connection enables a weight- and cost-saving as well as easy-to-handle detachable positive and non-positive insertion of the transition channel that comprises the guide blades into the disk space between the high and low-pressure parts of the aircraft gas turbine, which is preferably designed as a two-shaft turbine. The straight-line contact between the bars of the guide blade segment and the assigned bearing surfaces enables moreover a simple sealing of said segment.

The invention claimed is:

1. An arrangement for fixing a guide blade segment that forms part of a transition channel between the housing and the bearing pedestal of a turbine housing of a high-pressure turbine and a low-pressure turbine with aircraft gas turbines having different diameters, the transition channel transitioning from a smaller diameter of the high-pressure turbine to a larger diameter of the lower pressure turbine, wherein the guide blade segment comprises an outer platform and an inner platform tensioning the guide blades, wherein the outer and inner platforms, for axial positioning and sealing of the guide blade segment, comprise bars, wherein each of the bars enables a straight surface contact with bearing surfaces of the bearing pedestal and the turbine housing, wherein the guide blade segment, by way of an upstream groove-hook-type connection assigned to the outer platform, is held radially on the turbine housing and secured against rotation by way of a substantially radially extending pin that engages in a slot defined in a hook of the hook-groove-type connection, and wherein a groove of the groove-hook-type connection is assigned to one of the bearing surfaces of the turbine housing and the hook of the groove-hook-type connection is assigned to the outer platform of the guide blade segment.

2. An arrangement for fixing a guide blade segment that forms part of a transition channel between the housing and the bearing pedestal of a turbine housing of a high-pressure turbine and a low-pressure turbine with aircraft gas turbines having different diameters, the transition channel transitioning from a smaller diameter of the high-pressure turbine to a larger diameter of the lower pressure turbine, wherein the guide blade segment comprises an outer platform and an inner platform tensioning the guide blades, wherein the outer and inner platforms, for axial positioning and sealing of the guide blade segment, comprise bars, wherein each of the bars enables a straight surface contact with bearing surfaces of the bearing pedestal and the turbine housing, wherein the guide blade segment, by way of an upstream groove-hook-type connection assigned to the outer platform, is held radially on the turbine housing and secured against rotation by way of a pin that engages in the hook-groove-type connection, wherein grooves of the groove-hook-type connection are assigned to the bearing surfaces of the turbine housing and hooks of the groove-hook-type connection are assigned to the outer platform of the guide blade segment, and wherein the bearing surfaces of the turbine housing to which the grooves of the hook-groove-type connection are assigned also form bearing surfaces for an upstream channel segment of the transition channel, which is locked in its installed position by the guide blade segment.

3. A process of fixing a guide blade segment that forms part of a transition channel between the housing and the bearing pedestal of a turbine housing of a high-pressure and a low-pressure turbine with aircraft gas turbines having different diameters, the transition channel transitioning from a smaller diameter of the high-pressure turbine to a larger diameter of the lower pressure turbine, the guide blade segment comprising an outer platform and an inner platform tensioning the guide blades, the platforms, for axial positioning and sealing of the guide blade segment, comprising bars, each of the bars enabling a straight surface contact with bearing surfaces of the bearing pedestal and the turbine housing, the guide blade segment, by way of an upstream groove-hook-type connection assigned to the outer platform, being held radially on the turbine housing, a groove of the groove-hook-type connection being assigned to one of the bearing surfaces of the turbine housing and a hook of the groove-hook-type connection being assigned to the outer platform of the guide blade segment, comprising securing the guide blade segment against rotation by way of a substantially radially extending pin that engages in a slot defined in the hook of the hooking-groove-type connection.

4. A process of fixing a guide blade segment that forms part of a transition channel between the housing and the bearing pedestal of a turbine housing of a high-pressure and a low-pressure turbine with aircraft gas turbines having different diameters, the transition channel transitioning from a smaller diameter of the high-pressure turbine to a larger diameter of the lower pressure turbine, the guide blade segment comprising an outer platform and an inner platform tensioning the guide blades, the platforms, for axial positioning and sealing of the guide blade segment, comprising bars, each of the bars enabling a straight surface contact with bearing surfaces of the bearing pedestal and the turbine housing, the guide blade segment, by way of an upstream groove-hook-type connection assigned to the outer platform, being held radially on the turbine housing, the grooves of the groove-hook-type connection being assigned to the bearing surfaces of the turbine housing and hooks of the groove-hook-type connection being assigned to the outer platform of the guide blade segment, comprising securing the guide blade segment against rotation by way of a pin that engages in the hooking-groove-type connection, wherein the bearing surfaces of the turbine housing to which the grooves of the hook-groove-type connection are assigned also form bearing surfaces for an upstream channel segment of the transition channel, which is locked in its installed position by the guide blade segment.

* * * * *